(12) United States Patent
Kreuger

(10) Patent No.: US 10,955,156 B1
(45) Date of Patent: Mar. 23, 2021

(54) AIR CONDITIONING AND HUMIDITY CONTROL SYSTEM AND METHODS OF MAKING AND USING THE SAME

(71) Applicant: Sten Kreuger, Chonburi (TH)

(72) Inventor: Sten Kreuger, Chonburi (TH)

( * ) Notice: Subject to any disclaimer, the term of this patent is extended or adjusted under 35 U.S.C. 154(b) by 0 days.

(21) Appl. No.: 16/710,877

(22) Filed: Dec. 11, 2019

(51) Int. Cl.
  *F24F 11/00* (2018.01)
  *F24F 11/80* (2018.01)

(52) U.S. Cl.
  CPC .......... *F24F 11/0008* (2013.01); *F24F 11/80* (2018.01)

(58) Field of Classification Search
  CPC .......... F24F 11/0008; F24F 2003/1435; F24F 1/0083; F24F 1/037; F24F 3/14; F24F 3/1411; F24F 6/00; F24F 6/04; F24F 6/043
  See application file for complete search history.

(56) References Cited

U.S. PATENT DOCUMENTS

| | | | | |
|---|---|---|---|---|
| 1,750,047 A * | 3/1930 | Metzger | ...................... | F24F 6/04 261/103 |
| 2,326,089 A * | 8/1943 | Wittman | ............. | F24D 19/0082 261/70 |
| 2,947,452 A * | 8/1960 | Frohmader | ............... | F24F 6/04 222/187 |
| 4,158,679 A * | 6/1979 | Yeagle | ...................... | F24F 6/04 261/106 |
| 5,037,586 A * | 8/1991 | Mehrholz | ................. | F24F 6/04 261/142 |
| 5,273,687 A * | 12/1993 | Osborne | .................... | F28C 1/02 261/111 |
| 5,425,902 A * | 6/1995 | Miller | ...................... | B01J 19/32 261/128 |
| 5,765,544 A * | 6/1998 | Vigansky, Jr. | ........ | F24C 15/003 126/113 |
| 5,948,324 A * | 9/1999 | Cook | ........................ | F24F 6/00 261/106 |

(Continued)

FOREIGN PATENT DOCUMENTS

| | | | | |
|---|---|---|---|---|
| CN | 106369722 A | * | 2/2017 | |
| FR | 2641853 A1 | * | 7/1990 | ............... F24F 6/04 |

(Continued)

*Primary Examiner* — Nelson J Nieves
(74) *Attorney, Agent, or Firm* — Andrew D. Fortney; Central California IP Group, P.C.

(57) ABSTRACT

An air conditioning and humidity control system, a kit, and methods of making and using the same are disclosed. The air conditioning and humidity control system includes a main conduit, distribution conduits joined to the main conduit, one or more mesh members, one or more troughs or pans below the mesh member(s), and a pump. The distribution conduits receive a fluid from the main conduit and include one or more holes to distribute the fluid. The mesh member(s) receive the fluid from the distribution conduits, and allow the fluid to flow along its length. The trough(s) or pan(s) collect the fluid from the mesh member(s). The pump receives the fluid from the trough(s) or pan(s) and pumps the fluid to/through the main conduit. The air conditioning and humidity control system effectively controls the temperature and humidity of an enclosed room or building, improves air quality, is simple and inexpensive to make and operate, and avoids use of greenhouse gases.

16 Claims, 4 Drawing Sheets

(56) References Cited

U.S. PATENT DOCUMENTS

| | | | | |
|---|---|---|---|---|
| 6,000,684 | A * | 12/1999 | Pasch | F24F 6/043 261/104 |
| 6,129,285 | A * | 10/2000 | Schafka | F24F 3/14 236/44 C |
| 6,168,140 | B1 * | 1/2001 | Akazawa | F24F 6/043 261/80 |
| 6,189,869 | B1 * | 2/2001 | Stanek | F24F 6/043 261/107 |
| 6,354,572 | B1 * | 3/2002 | Menassa | F24F 6/04 261/39.1 |
| 6,367,277 | B1 * | 4/2002 | Kinkel | F24F 5/0035 62/310 |
| 6,367,782 | B1 * | 4/2002 | Guetersloh | F28D 5/02 239/553.5 |
| 6,394,427 | B1 * | 5/2002 | Guetersloh | F24F 6/02 261/106 |
| 6,572,085 | B2 * | 6/2003 | Bloemer | F24F 6/04 126/113 |
| 6,622,993 | B2 * | 9/2003 | Mulvaney | G01F 23/22 261/107 |
| 7,131,639 | B2 * | 11/2006 | Kammerzell | F24F 11/0008 261/96 |
| 7,850,769 | B2 * | 12/2010 | Takahashi | F24F 3/16 96/239 |
| 9,285,133 | B2 * | 3/2016 | Schneider | F24F 11/0008 |
| 9,845,961 | B2 * | 12/2017 | Saito | F24F 11/0008 |
| 2003/0001294 | A1 * | 1/2003 | Permenter | F24F 5/0035 261/97 |
| 2011/0068486 | A1 * | 3/2011 | Quam | F24F 6/043 261/26 |
| 2013/0014531 | A1 * | 1/2013 | Gass | F24F 5/0035 62/259.4 |
| 2013/0186611 | A1 * | 7/2013 | Schneider | F24F 11/0008 165/226 |
| 2014/0075959 | A1 * | 3/2014 | Lenkszus | F24F 1/0007 62/3.2 |
| 2014/0230479 | A1 * | 8/2014 | Ito | F24F 3/1429 62/271 |
| 2015/0068962 | A1 * | 3/2015 | Kim | F24F 3/14 210/192 |
| 2016/0146483 | A1 * | 5/2016 | Sakai | F24F 6/025 62/176.4 |
| 2017/0198926 | A1 * | 7/2017 | Ota | F24F 3/147 |
| 2018/0094825 | A1 * | 4/2018 | Peczalski | F24F 13/222 |
| 2019/0032934 | A1 * | 1/2019 | Sakai | F24F 6/04 |
| 2019/0041076 | A1 * | 2/2019 | Prewer | F24F 11/0008 |
| 2019/0120509 | A1 * | 4/2019 | Seeley | F28C 1/04 |
| 2020/0080736 | A1 * | 3/2020 | Herrmann | F24F 6/14 |
| 2020/0096227 | A1 * | 3/2020 | Fridlyand | F24F 13/222 |
| 2020/0208872 | A1 * | 7/2020 | Lanning | F24F 13/222 |

FOREIGN PATENT DOCUMENTS

| | | | | |
|---|---|---|---|---|
| KR | 20040027002 A | * | 4/2004 | |
| KR | 20140076986 A | * | 6/2014 | |
| KR | 20140081763 A | * | 7/2014 | |
| KR | 20180013323 A | * | 2/2018 | |
| KR | 20180051009 A | * | 5/2018 | |
| WO | WO-2010082204 A1 | * | 7/2010 | F24F 6/043 |
| WO | WO-2015065242 A1 | * | 5/2015 | F24F 6/04 |
| WO | WO-2015093079 A1 | * | 6/2015 | F24F 6/04 |
| WO | WO-2018165799 A1 | * | 9/2018 | F24F 6/04 |

* cited by examiner

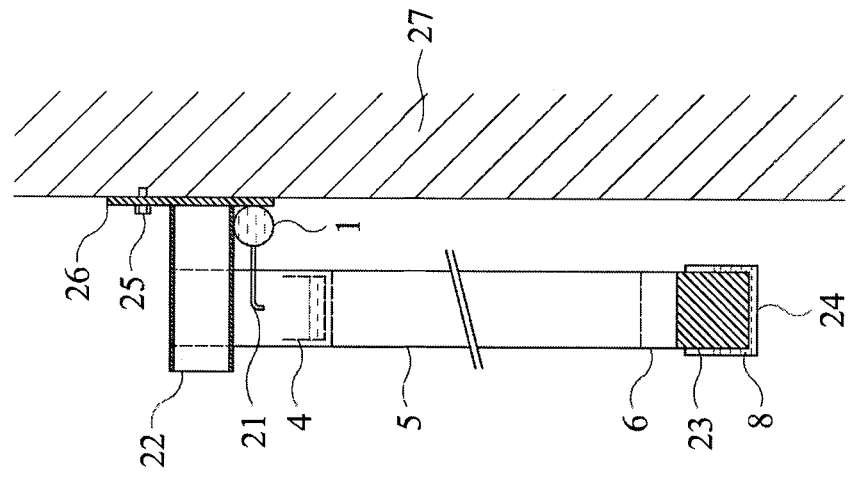
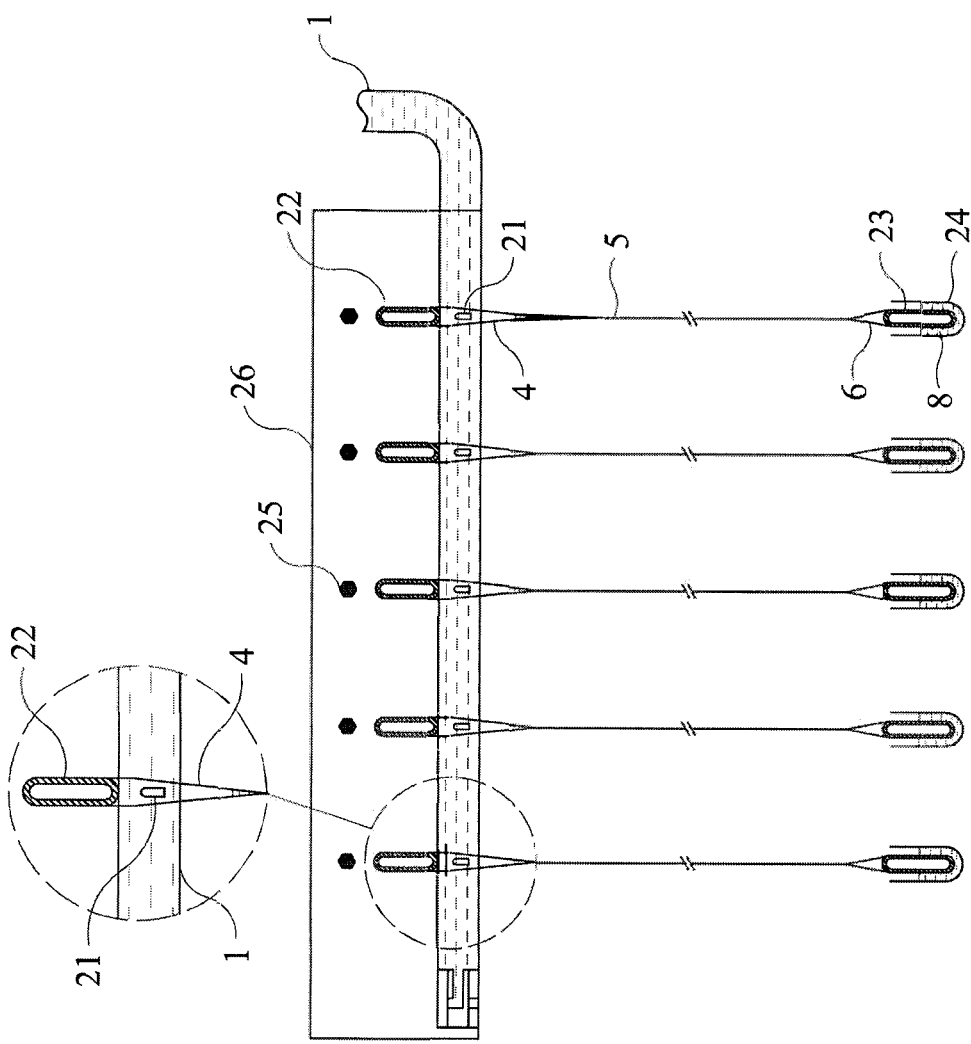
FIG. 3B
FIG. 3A

AIR CONDITIONING AND HUMIDITY CONTROL SYSTEM AND METHODS OF MAKING AND USING THE SAME

FIELD OF THE INVENTION

The present invention generally relates to the field of air conditioning and humidity control systems and methods of making and using the same. More specifically, embodiments of the present invention pertain to an air conditioning and humidity control system including a main conduit, a plurality of distribution conduits and one or more mesh members configured to allow a fluid to flow along its length, a kit for such a system, and methods of making and using the same.

DISCUSSION OF THE BACKGROUND

Typically, conventional air conditioning systems are regulated digitally (i.e., on-off) or by varying the temperature of the cooling surface. This latter method often results in very dry air and high cooling rates. Dry air is a primary contributor for transmission of flu and cold viruses.

SUMMARY OF THE INVENTION

The present invention relates to an air conditioning and humidity control system, a kit for such a system, and methods of making and using the same. The present air conditioning and humidity control system effectively and naturally controls the temperature and humidity of an enclosed room or building, can act as a filter to improve the air quality of the room(s) or building in which it is located, is relatively simple and inexpensive to operate, and can use environmentally friendly fluids (e.g., water) while avoiding use of so-called "greenhouse gases" such as fluorocarbons or hydrofluorocarbons.

The air conditioning and humidity control system comprises a main conduit, configured to transport a fluid, a plurality of distribution conduits joined to the main conduit and in fluid communication with the main conduit, one or more (e.g., a plurality of) mesh members, one or more troughs or pans below the mesh member(s), and a pump. The distribution conduits are configured to receive the fluid from the main conduit, and each distribution conduit has one or more holes therein to distribute the fluid. Each mesh member has a width, a length, and one or more suspension mechanisms at a first end thereof. Each mesh member is configured to receive the fluid from the hole(s) in a corresponding distribution conduit, and is configured to allow the fluid to flow along its length. The trough(s) or pan(s) are configured to collect the fluid from the mesh member(s). The pump is configured to receive the fluid from the trough(s) or pan(s) and pump the fluid to and/or through the main conduit. The fluid advantageously comprises or consists essentially of water, although the invention is not limited thereto.

In some embodiments, the main conduit comprises a horizontal or substantially horizontal section to which the distribution conduits are joined. The distribution conduits may also extend horizontally or substantially horizontally from the horizontal or substantially horizontal section of the main conduit. Thus, each distribution conduit may extend from the horizontal or substantially horizontal section of the main conduit parallel to one or more adjacent distribution conduits.

In some examples, the distribution conduits may be equally spaced along a length of the main conduit. In other or further examples, the distribution conduits may comprise first and second subsets of distribution conduits on first and second opposed sides of the main conduit, respectively.

In some embodiments, each of the distribution conduits has a plurality of holes spaced apart along a length of the distribution conduit. In other or further embodiments, each of the distribution conduits has (i) equal or substantially equal dimensions and/or (ii) a number of holes equal to the other distribution conduit(s). The holes may be in the same location(s) as in the other distribution conduit(s).

In some embodiments, the suspension mechanism(s) comprise one or more loops at a first end of each mesh member, in contact with a corresponding distribution conduit or other suspension member. For example, each of the loop(s) may comprise an opening and a pocket. The opening may have dimensions configured to slide the mesh member onto a corresponding distribution conduit or other suspension member. The pocket may be configured to distribute the fluid across the width of the mesh member. In other or further examples, the ratio of the depth of each pocket to the width of the mesh member(s) is from 1:50 to 1:1.

In various embodiments, each mesh member may further comprise a holder at or near a lowermost end of the mesh member. In various examples, each holder may comprise a second loop, pocket or opening, and each holder may extend completely or substantially across the width of the mesh member. In a further embodiment, each mesh member may further comprise a weight in the holder.

In one embodiment, the mesh member(s) may comprise a cloth or fabric. In one example, the cloth or fabric may have a reinforced border. In other or further examples, the cloth or fabric has a weight, a thickness and a permeability that allow the fluid to flow at a rate of 5-1000 ml/min·cm when the mesh member is suspended vertically from the distribution conduit(s) or other suspension member(s).

The pump may apply, or result in, the fluid having a certain pressure in the main conduit, the distribution conduit(s), and/or a secondary conduit between the main conduit and a subset of the distribution conduits. Thus, in further embodiments, the present air conditioning and humidity control system may further comprise one or more valves in the main conduit, the distribution conduit(s) and/or the secondary conduit, configured to control the flow of the water or other fluid to a subset of the mesh members. Each of the valves may comprise a solenoid valve. In one example, each of the distribution conduits includes one of the valves. The valves can be controlled electronically, and the system may further comprise an electronic control system configured to control the valves. In other embodiments, a first valve controls the flow of the water or other fluid to a first subset (e.g., a first plurality) of the distribution conduits, a second valve controls the flow of the water or other fluid to a second subset (e.g., a second plurality) of the distribution conduits, a third valve controls the flow of the water or other fluid to a third subset (e.g., a third plurality) of the distribution conduits, etc.

In another aspect, the present invention concerns a kit for an air conditioning and humidity control system, comprising a main conduit configured to transport a fluid, a plurality of distribution conduits connected or connectable to the main conduit and configured to receive the fluid from the main conduit, one or more (e.g., a plurality of) mesh members, one or more troughs or pans, and a pump. Each of the distribution conduits has one or more holes therein to distribute the fluid. Each mesh member has a width, a length, and one or more suspension mechanisms at a first end thereof. Each mesh member is configured to (i) receive the fluid from the hole(s) in a corresponding distribution conduit and (ii) allow the fluid to flow along its length and/or width when suspended from its first end. The trough(s) or pan(s) are generally below a second end of the mesh members, and are configured to collect the fluid from the mesh member(s) when suspended by the distribution conduits. The second end of the mesh members is opposite from the first end of the mesh members. The pump is configured to pump the fluid to and/or through the main conduit.

In various embodiments of the present kit, the main conduit may comprise a first section with a plurality of connection mechanisms along a length thereof to which the distribution conduits are joined. Alternatively or additionally, the main conduit may comprise a second section configured to transport the fluid from the pump to the first section of the main conduit. In various embodiments, each of the connection mechanisms are configured to join the distribution conduits to the first section of the main conduit such that each of the distribution conduits extends from the first section of the main conduit (i) in a common plane and/or (ii) parallel to one or more adjacent distribution conduits.

In various examples, each of the connection mechanisms may comprise a nipple or an opening, and each nipple or opening may be configured to mate with one of the plurality of distribution conduits. In one configuration, the connection mechanisms are equally spaced along the length of the main conduit. In another or further configuration, the connection mechanisms comprise first and second subsets of connection mechanisms on first and second opposed sides of the main conduit, respectively.

As for the present air conditioning and humidity control system, each of the distribution conduits in the present kit may have a plurality of holes spaced apart along its length. Each of the holes may be along a common line or axis. In various examples, each of the distribution conduits in the present kit may have substantially equal dimensions and/or a number of holes equal to the other distribution conduit(s). The holes may be in the same location(s) as in the other distribution conduit(s).

Similar to the present air conditioning and humidity control system, each suspension mechanism in the present kit may comprise one or more loops at the first end of each mesh member. The loop(s) may be in contact with a corresponding distribution conduit or other suspension member. Additionally or alternatively, each loop may comprise an opening and a pocket. The opening may have dimensions configured to slide the mesh member onto the corresponding distribution conduit or other suspension member, and/or the pocket may be configured to distribute the fluid across the width of the mesh member. In various examples, like the present air conditioning and humidity control system, the ratio of a depth of each of the pockets to the width of the mesh member may be from 1:50 to 1:1.

In other or further embodiments of the present kit, each mesh member may further comprise a holder at or near a lowermost end of the mesh member, and the kit may further comprise one or more weights having dimensions configured to fit in the holder. In various examples, each holder may comprise a second loop, pocket or opening, and/or may extend completely or substantially completely across the width of the mesh member.

Similar to the present air conditioning and humidity control system, each mesh member in the present kit may comprise a cloth or fabric. The cloth or fabric may have a reinforced border and/or a weight, thickness and permeability that allow the fluid to flow at a rate of 5-1000 ml/min·cm when the mesh member is suspended vertically from the corresponding distribution conduit or other suspension member.

Yet another aspect of the present invention relates to a method of controlling a temperature and/or humidity level of air in a room or building, comprising pumping a fluid through a main conduit using a pump, distributing the fluid to a plurality of distribution conduits joined to the main conduit and in fluid communication with the main conduit, passing the fluid through one or more holes in each of the plurality of distribution conduits to a mesh member, collecting the fluid from the mesh member(s) in a trough or pan below the mesh member(s), and transporting the fluid from the trough or pan to the pump. Each mesh member has a width, a length, and one or more suspension mechanisms at an end thereof opposite from the trough or pan. Each mesh member is configured to allow the fluid to flow along its length. As in the present system, the fluid in this method advantageously comprises or consists essentially of water, but is not necessarily limited thereto.

Similar to the present system and/or kit, the main conduit in the present method may comprise a horizontal or substantially horizontal section (to which the plurality of distribution conduits are joined) and/or a vertical or substantially vertical section. The fluid may be pumped through the vertical or substantially vertical section to the horizontal or substantially horizontal section of the main conduit.

Similar to the present system and/or kit, the distribution conduits in the present method may be equally spaced along the length of the main conduit. Alternatively or additionally, the fluid may be distributed among first and second subsets of distribution conduits on first and second opposed sides of the main conduit, respectively. In various embodiments of the method, the distribution conduits may extend (i) horizontally or substantially horizontally from the horizontal or substantially horizontal section of the main conduit and/or (ii) from the horizontal or substantially horizontal section of the main conduit parallel to one or more adjacent distribution conduits.

The present method of method of controlling a temperature and/or humidity level may (further) comprise passing the fluid through a plurality of holes in each of the distribution conduits. The holes may be spaced apart along the length of each distribution conduit, as in embodiments of the present system and/or kit. Similarly, for example, each of the distribution conduits may have substantially equal dimensions and/or the same number of holes as the other distribution conduit(s). The holes may be in the same location(s) as in the other distribution conduit(s).

Similar to the present system and/or kit, the suspension mechanism(s) in the present method may comprise one or more loops at an end of each mesh member, in contact with a corresponding distribution conduit or other suspension member. Each loop may comprise an opening and a pocket. Similar to the present system and/or kit, the opening may have dimensions configured to slide the mesh member onto the corresponding distribution conduit or other suspension member, and/or the pocket may be configured to distribute the fluid across the width of the mesh member. In various examples, the ratio of the depth of each pocket to the width of the mesh member may be from 1:50 to 1:1.

In some embodiments, the present method of controlling a temperature and/or humidity level may further comprise placing a weight in a holder at or near a lowermost end of each of the plurality of the mesh members. Similar to the present system and/or kit, each holder may comprise a second loop, pocket or opening, and/or may extend completely or substantially completely across the width of the mesh member.

As in the present system and/or kit, each mesh member in the present method may comprise a cloth or fabric. The cloth or fabric may have a reinforced border and/or a weight, thickness and permeability that allow the fluid to flow at a rate of 5-1000 ml/min·cm when the mesh member is completely suspended vertically from the corresponding distribution conduit.

Further embodiments of the present method of controlling a temperature and/or humidity level may further comprise removing the mesh member(s) from the distribution conduits, cleaning the mesh member(s), and/or placing the mesh member(s) on the distribution conduits or other suspension member. In other or even further embodiments, the method may further comprise cooling the fluid and/or filtering the fluid. In various examples, the fluid is cooled by passing the fluid through or over a conventional heat exchanger, after collecting the fluid from the mesh member(s) and/or during transporting the fluid from the trough or pan to the pump. Alternatively, the fluid may be cooled after pumping the fluid to the main conduit (e.g., as the fluid passes through the main conduit). The fluid may also be filtered by passing the fluid through a conventional filter, operably connected to or inserted in the main conduit and/or a return or collection conduit (e.g., through which the fluid is transported from the trough or pan to the pump).

The pump may cause the fluid in the main conduit to have a pressure of greater than 1 atm (which may be predetermined). Thus, the present method of controlling a temperature and/or humidity level may further comprise controlling a flow of the fluid using one or more valves (e.g., in the main conduit, one or more of the secondary conduits, and/or one or more of the distribution conduits). The valve(s) may be configured to restrict, reduce or stop the flow of the fluid.

A still further aspect of the present invention relates to a method of making an air conditioning and humidity control system, comprising operably connecting a main conduit to a pump, forming one or more holes in each of a plurality of distribution conduits, operably connecting the plurality of distribution conduits to the main conduit, placing a mesh member on the plurality of distribution conduits or other suspension member, placing a trough or pan below the mesh member(s) opposite from the first end, and operably connecting the trough or pan to the pump such that the fluid can be transported from the trough or pan to the pump. The main conduit is in fluid communication with the pump. The distribution conduits are in fluid communication with the main conduit. Each of the mesh members has a width, a length, and one or more suspension mechanisms in contact with a corresponding distribution conduit or other suspension member, such that each mesh member is configured to allow a fluid from the corresponding one of the plurality of distribution conduits to flow along its length. The trough or pan is configured to collect the fluid from the mesh member(s).

BRIEF DESCRIPTION OF THE DRAWINGS

FIGS. 3A-B show a second exemplary embodiment of the present system.

DETAILED DESCRIPTION OF VARIOUS EMBODIMENTS

Examples of various embodiments of the invention are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

Figure 1B:
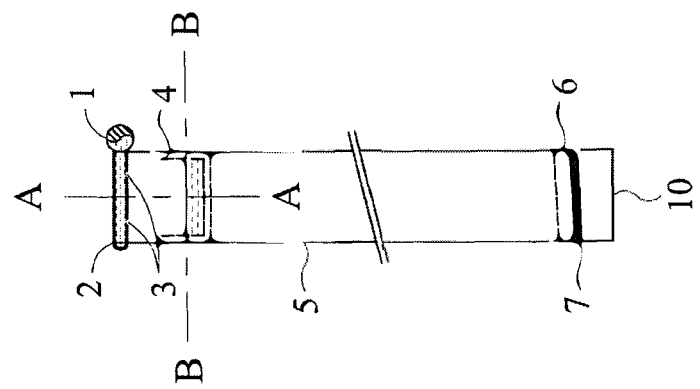
FIGS. 1A-B show a first exemplary embodiment of the present system.
Figure 1A:
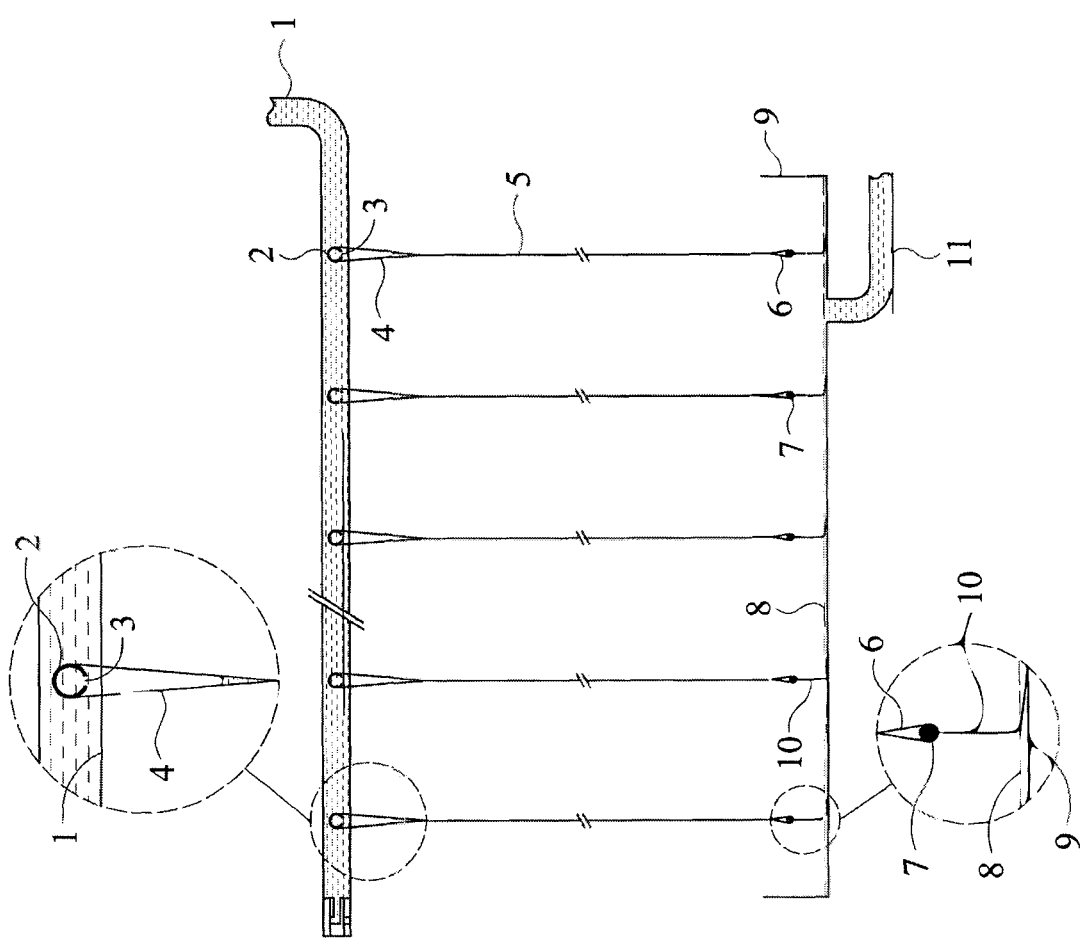

FIG. 1A shows a first embodiment of the present air conditioning and humidity control system, including a main conduit 1, a plurality of distribution conduits 2 joined to the main conduit 1 and in fluid communication with the main conduit 1, a plurality of mesh members 5 each having a suspension mechanism (e.g., a loop 4) at a first end thereof in contact with a corresponding distribution conduit 2, a trough 9 below an opposite end of the mesh member 5, and a return or collection conduit 11. The main conduit 1 is configured to transport a fluid (designated by dashes), such as water, to the distribution conduits 2. Each distribution conduit 2 is configured to receive the fluid from the main conduit 1, and each distribution conduit 2 has one or more holes 3 along a length thereof to distribute the fluid (e.g., to the corresponding mesh member 5). Each mesh member 5 is configured to receive the fluid from the hole(s) 3 in the distribution conduit 2 and allow the fluid to flow along its length. The trough 9 is configured to collect the fluid 8 from the plurality of mesh members 5. The return or collection conduit 11 transports the fluid 8 from the trough 9 to a source of and/or storage vessel for the fluid provided to the main conduit 1. For example, the air conditioning and humidity control system of FIG. 1 may further include a pump (not shown), configured to receive the fluid 8 from the trough 9 and pump the fluid to and/or through the main conduit 1.

Thus, the fluid in the main conduit 1 and flowing down the mesh members 5 is the same as the fluid 8 in the trough 9.

In the embodiment of FIG. 1A, the main conduit 1 has a horizontal or substantially horizontal section to which the distribution conduits 2 are joined. The main conduit 1 may also have a vertical or substantially vertical section (not shown) that transports the fluid from the pump to the horizontal section of the main conduit 1. The section of the main conduit 1 above the cut-off line extends above the ceiling of a room, building or other enclosure, or between floors of a multi-floor building or enclosure. Thus, between the vertical section and the horizontal section, the main conduit 1 may have one or more P-, J-, U-, C- and/or S-shaped sections of pipe or tubing, which may form a trap (not completely shown) configured to allow the fluid to flow down into the horizontal section, and optionally (in combination with a suitable vent such as a pressure-controlled valve) prevent backflow of the fluid from the main conduit 1 to the pump when the pump is not operating.

As shown in FIG. 1A, the distribution conduits 2 can be equally spaced along a length of the main conduit 1. The system of FIG. 1A has 5 distribution conduits 2, but there may be more (e.g., up to 25, 30, 40 or more) or less (e.g., 2, 3 or 4). Some variations of the system include first and second subsets of distribution conduits 2 on first and second opposed sides of the main conduit 1, respectively (not shown). In such variations, each of the first and second subsets of distribution conduits 2 may include two or more distribution conduits.

Referring now to FIG. 1B, each of the plurality of distribution conduits 2 extends horizontally or substantially horizontally from the horizontal section of the main conduit 1. In the embodiment shown in FIGS. 1A-B, each of the distribution conduits 2 extends from the horizontal section of the main conduit 1 parallel to adjacent distribution conduit(s) 2. In general, to facilitate manufacturing and assembly of the system, each distribution conduit 2 has substantially equal dimensions and an equal number of holes as the other distribution conduits, and the hole(s) are in the same location(s) as the hole(s) in the other distribution conduits, but uniformity and equality of dimensions and/or features among the distribution conduits 2 is not required.

As shown in FIG. 1B, each of the distribution conduits 2 may have a plurality of holes 3 spaced apart along its length. The distribution conduits 2 may each have, for example, from two to six holes along a lower surface thereof, but the number of holes is not limited to these numbers, and a single hole 3 can be sufficient to distribute the fluid across the width of the mesh member 5.

Each of the plurality of mesh members 5 has a width, a length, and a suspension mechanism (e.g., one or more loops 4). For example, the width of each mesh member 5 may be from 5 cm to 50 cm, or any value or range of values therein, but is not limited to such a width. The embodiment of FIGS. 1A-B shows a single loop 4, although other configurations are envisioned. For example, the suspension mechanism may comprise a plurality of holes or openings in the first end of the mesh member 5 and a corresponding number of rings that each pass through the hole or opening in the mesh member (which may be reinforced with a grommet) and slide onto the distribution conduit 2, similar to a curtain on a curtain rod.

Figures 2A, 2B, 2C:
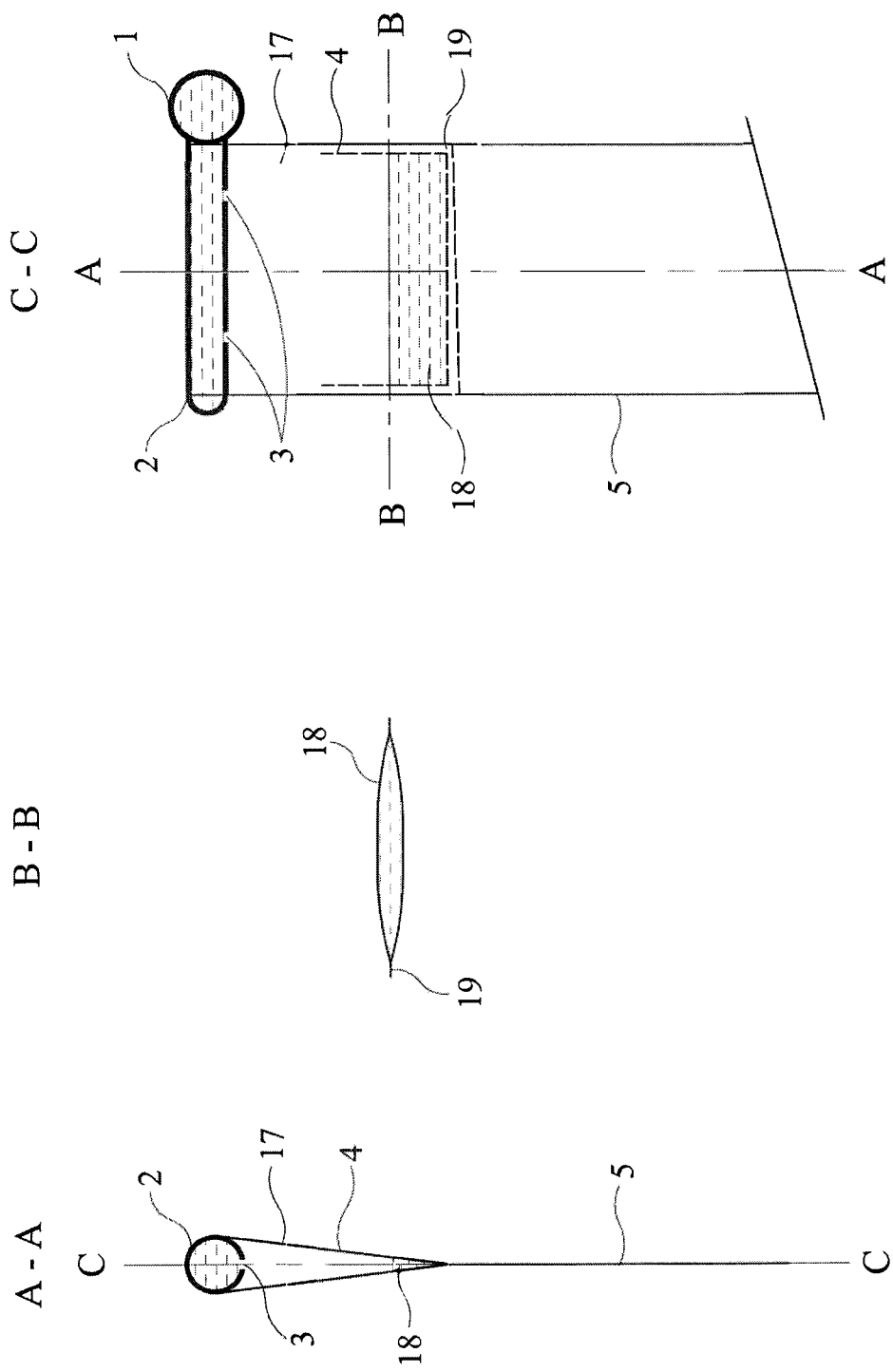
FIGS. 2A-C show details of an exemplary mechanism for distributing fluid across an exemplary mesh member, using the exemplary distribution mechanism and exemplary distribution conduit of FIGS. 1A-B.

Referring now to FIGS. 2A-C, the loop 4 may have an opening 17 and a pocket 18. FIG. 2A is a cross-section of the first end of the mesh member 5 on a corresponding distribution conduit 2, taken along the line A-A in FIG. 2C. FIG. 2B is a top-down view of a cross-section of the pocket of the loop 4, taken along the line B-B in FIG. 2C. FIG. 2C is a facing view of the first end of the mesh member 5 and corresponding distribution conduit 2 connected to the main conduit 1 of FIG. 1B, taken along the line C-C in FIG. 2A.

The opening 17 generally has dimensions configured to slide the mesh member 5 onto the corresponding distribution conduit 2. The pocket 18 is configured to distribute the fluid across the width of the mesh member 5. Typically, the depth of the pocket 18, the weight and permeability of the mesh member 5, the stitching and/or reinforcement at the bottom of the pocket, or a combination of some or all of these parameters results in distribution of the fluid across the width of the mesh member 5, even when there is only a single opening 3. For example, the ratio of the depth of the pocket to the width of the mesh member 5 may be from 1:50 to 1:1, or any value or range of values therein, but is not necessarily so limited.

As shown in FIG. 2B, the pocket 18 of the loop 4 has a sealed edge or border 19. The sealed edge or border 19 may comprise stitching (e.g., of a part of the mesh member 5 that is folded upon itself to form the loop 4), an adhesive, a peripheral fastening material (such as tape), hook-and-loop fasteners (e.g., VELCRO), snaps, rivets, combinations thereof, etc. Alternatively, a triangular or substantially triangular piece of cloth, fabric or other material can be stitched into the lowermost portion of each end of the loop 4 to form the pocket. In a further alternative, one or more openings may be present in or along the bottom of the sealed edge or border 19, for example, to ensure a certain fluid flow rate or flow rate range, to reduce or avoid collecting dirt or other foreign matter in the pockets 18, etc.

In some examples, each of the mesh members 5 is a sheet, such as a cloth or fabric. In some variations, the cloth or fabric has a reinforced border. For example, the cloth or fabric along the border may be folded back upon and stitched to itself. Alternatively, the cloth or fabric may have one or more borders with a selvage.

Referring back to FIG. 1A, each of the mesh members 5 further comprises a holder 6 at or near a lowermost end of the mesh member 5. The holder 6 may have dimensions and/or a configuration adapted to hold a weight 7 therein. For example, each of the holders 6 may comprise a second loop, pocket or opening. The weight 7 may comprise a bar or block configured to (e.g., having dimensions and/or a mass) inhibit or prevent the mesh member 5 from folding upon itself. In the embodiment of FIG. 1B, the holder 6 and the weight 7 extend completely across the width of the mesh member 5. However, in alternative embodiments, the holder 6 may comprise a pocket that extends substantially across the width of the mesh member 5, and the weight 7 may have dimensions and a mass that enable it to be easily placed within and removed from the pocket, while at the same time inhibit or prevent the mesh member 5 from folding upon itself, or sticking to or becoming entangled with a nearby mesh member 5. Alternatively, the pocket formed by the holder 6 may have dimensions (e.g., depth, width and/or thickness) sufficiently large to include a mass of fluid that can replace the weight 7.

Each of the mesh members 5 may further comprise an extension 10 that extends into the trough 9. Such an arrangement ensures that all of the fluid is collected in the trough 9. In the embodiment shown in FIG. 1A, the extension 10 may extend into the fluid 8 collecting in the trough 9, in which case some or all unwanted noise (e.g., from water dripping into the trough or pan 9 from the mesh member 5 and/or the holder 6) may be advantageously reduced or eliminated. However, the extension 10 is not required to extend into the fluid 8. The fluid 8 in the trough is transported by the return or collection conduit (e.g., a tube or pipe) 11 to the pump for recirculation to the main conduit 1.

In the present system, the fluid may comprise or consist essentially of water, although other fluids and combinations thereof (e.g., with water) are also contemplated. The higher the purity of the water, the less frequently the system is maintained (e.g., cleaning the mesh members 5, cleaning or unclogging the holes 3 in the distribution members 2, etc.). To control the temperature and humidity of the room or building, the cloth or fabric of the mesh members 5 may have a weight, a thickness and a permeability that allow the fluid to flow at a rate of 5-1000 ml/min·cm (or any value or range of values therein) when the mesh member 5 is completely suspended vertically from the corresponding distribution conduit 2. However, the actual flow rate of the fluid along the cloth or fabric per unit time and per unit width of the cloth or fabric can depend on a number of factors (and/or be determined by use of such factors), such as size of the room or enclosure (e.g., in $m^3$), the fluid pumping rate of the pump, the size and number of distribution conduits 2 and/or holes 3 therein, the width of the mesh member 5, the porosity and/or void volume of the mesh members 5, etc.

The present air conditioning and humidity control system is particularly useful for controlling the temperature and humidity of an enclosable room or building. It is also useful for removing dust and other particles in the air when such dust/particles come in contact with the water or water surface on the mesh member 5. For example, smoke or other microparticles from tobacco can be cleaned from the air in a "smoking room." The contaminated fluid can then be cleaned (e.g., by passing it through a filter or reverse osmosis purification system) before it is used again. In various implementations, the pump may be located below the system (e.g., in a basement of the building or in a space below the floor of the room) or adjacent to the system (e.g., in a utility closet or other enclosure configured to reduce the noise from the pump in the room or other enclosure). The conduit(s) (e.g., one or more pipes or tubes) connecting the trough 9 or other water collection component to the pump may be in and/or below the floor of the room or other enclosure, and the conduit(s) (e.g., one or more pipes or tubes) from the pump to the main conduit 1 may be located behind a wall of the room or other enclosure (e.g., between walls of adjacent rooms). The pump may have a fluid pumping rate of, e.g., 0.25-5000 liters/min (or any value or range of values therein).

Referring now to FIGS. 3A-B, an alternative embodiment of the present air conditioning and humidity control system is shown. The air conditioning and humidity control system of FIGS. 3A-B is similar to that of FIGS. 1A-B, except for the distribution conduit 21, the suspension member 22, the holder 6, the weight 23 and the troughs 24. Components in FIGS. 3A-B having the same identification number as a component in FIGS. 1A-B or FIGS. 2A-C can have the same or similar structure and/or functionality as the component in FIGS. 1A-B or FIGS. 2A-C. The following discussion focuses on the different components.

For example, each of the mesh members 5 is suspended from a suspension member 22. As shown in FIGS. 3A-B, the suspension member 22 may comprise an oval plank or bar extending from a suspension mounting member 26. The suspension member 22 may have another shape, such as circular, elliptical, square, rectangular, etc., and may have any width, height or diameter that enables placement of the loop 4 on and/or over the suspension member 22. The suspension member 22 generally has a water-repellant outer surface (e.g., plastic or water-resistant metal) and has a length greater than the sum of the width of the mesh member 5 and the diameter or width of the main conduit 1.

The suspension member 22 is secured to and/or in the suspension mounting member 26 (e.g., by conventional methods and/or mechanisms for securing an extending piece or member from a flat vertical surface). The suspension mounting member 26 is secured to the wall 27 by a plurality of securing members 25. The securing members 25 may comprise, e.g., screws, bolt-and-nut pairs, etc. In the embodiment shown in FIG. 3A, the securing members 25 are in locations over the suspension members 22 (e.g., along a vertical line above and parallel to the corresponding suspension member 22) to maximize the contact of the suspension mounting member 26 to the wall 27 at points along the suspension mounting member 26 that bear weight, but the securing members 25 are not required to be placed in such locations. For example, they may be placed in the corners and/or along the periphery of the suspension mounting member 26, or if the suspension mounting member 26 has a shape other than rectangular, along the periphery of the suspension mounting member 26.

The holder 6 comprises a second loop configured to hold a substantially rectangular weight 23 therein. However, the holder 6 may be in the form of a pocket sewn or otherwise affixed to a surface of the mesh member 5 at a lowermost end. Thus, the holder 6 may extend across the entire or substantially the entire width of the mesh member 5.

The weight 23 has a width that may be from 75% to 125% of the width of the mesh member 5 and/or of the holder 6, but is not limited to this range. Additionally, the weight 23 has a height that may be from 40% to 80% of the width of the holder 6, but is not limited to this range. The weight 23 may have a mass effective to keep sufficient tension in the mesh member to keep it from folding upon itself, even when partially submerged in the fluid 8 in the trough or collector 24. The weight 23 may comprise plastic-coated stone or concrete, or water-resistant metal, in the shape of a rectangular plate or bar with an oval cross-section, but it may have another shape or cross-section, such as circular, elliptical, square, rectangular, etc., and may have any width, height or diameter that enables placement of the weight 23 in the holder 6.

The system includes a plurality of troughs or collectors 24. Each of the troughs or collectors 24 has a drain [not shown] in a lower half thereof (e.g., in a lowermost surface thereof). Each drain may be connected through a collection conduit to a manifold joined to a further conduit (e.g., pipe or tube) that transports the fluid 8 to the pump (not shown).

The main conduit 1 may be mounted on or secured to the suspension mounting member 26 by, e.g., round or circular brackets or C-clips secured to the suspension mounting member 26. However, the main conduit 1 can be secured to the wall 27 (or, alternatively, to the ceiling [not shown]) by one or more other mechanisms known in the art.

A plurality of distribution conduits 21 extend from the main conduit 1 and carry the fluid to the interior of the loop 4 in the mesh member 5. Although five distribution conduits 21 are shown in FIG. 3A, there can be essentially any number of two or more (e.g., 2, 3, 4, 6, 10, 20, 25, 30, etc.), although as a practical matter, more than 50 distribution conduits 21 extending from a single side of a single main conduit 1 may make maintenance and/or cleaning of the system and/or mesh members 5 lengthier than what might be considered optimal or desirable. The distribution conduits 21 also have a single hole at the end thereof opposite the end that is joined to the main conduit 1, although the distribution conduits 21 may have one or more holes along the lowermost surface thereof above the mesh member 5. As shown in FIG. 3B, the distribution conduits 21 may have a length of L±25%, where L=half of the length of the suspension mounting member 26+the width or diameter of the main conduit 1, but not limited thereto.

Alternatively, the distribution conduits 21 can distribute the fluid through holes or openings (e.g., "buttonholes") in, or into pockets on, a rectangular mesh member arranged in parallel with the main conduit 1. The mesh member can cover (but not contact) a wall similarly to a curtain or drape. When the rectangular mesh member includes an aesthetic pattern or artwork thereon, it can adorn a room (e.g., such as a conference room or other enclosed space).

Figure 4:
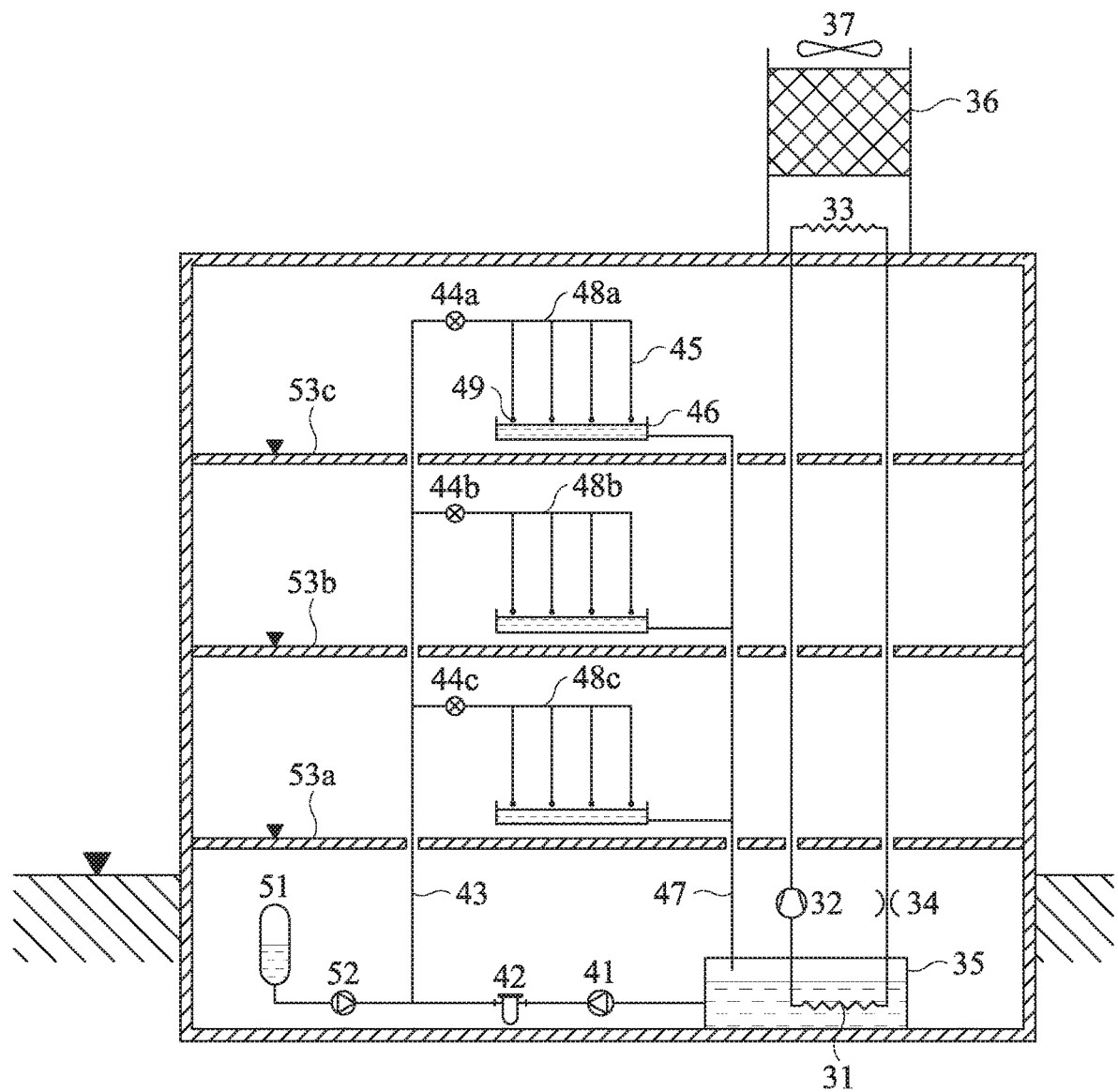
FIG. 4 shows a house or building with a further exemplary embodiment of the present system implemented therein.

FIG. 4 shows a house or other building with three floors and a basement, with an exemplary embodiment of the present system deployed therein. The system of FIG. 4 comprises a compressor 32, a cooling tower 36 with a heat exchanger 33, a JT expander 34, a cold fluid tank 35, an evaporator 37, a main pump 41, a filter 42, regulating valves 44a-c, a tank 51, and a dosage pump 52. The water or other fluid in the tank 51 may further include an anti-viral, anti-bacterial, anti-fungal and/or anti-scaling agent (e.g., copper ions or a liquid such as hydrogen peroxide or very dilute bleach [NaOCl solution]). In one example, copper ions are present in the water at a concentration of 0.1-100 ppm. The copper ions may be added by applying a current of 1 A to one or more copper electrodes that are at least partially immersed in the water (e.g., in the tank 51) for 1-4 hours (e.g., 2 hours) once every 7-14 days (e.g., every 10 days) to maintain a copper ion concentration of about 1 ppm. Copper ions may be preferred over hydrogen peroxide and dilute bleach for maintaining integrity of the mesh members 45.

Water or another temperature- and/or humidity-regulating fluid capable of flowing along the mesh members 45 is stored in the cold fluid tank 35. The water or other fluid may be maintained at a predetermined temperature, such as 0-20° C. (or any temperature or range of temperatures therein, such as 5-10° C.). The pump 41 pumps the fluid from the cold fluid tank 35 through a vertical or substantially vertical conduit 43 to each of a plurality of horizontal or substantially horizontal conduits 48a through 48c. The dosage pump 52 pumps additional fluid (which may further include an anti-viral, anti-bacterial, anti-fungal and/or anti-scaling agent) from the tank 51 into the fluid flowing in the conduit 43. The vertical conduit 43 passes through an opening in each of the floors 53a-c. The flow of fluid to each of the horizontal conduits 48a through 48c can be regulated or controlled by regulating valves 44a-c, respectively.

As described above, the fluid flows from each of the horizontal conduits 48a through 48c through one or more openings in each of a plurality of distribution conduits (not shown) in fluid communication with the respective horizontal conduit 48a, 48b or 48c, and down the suspended mesh members 45. Each of the mesh members 45 has a weight 49 in a holder (not shown) at the bottom of the mesh member 45.

As the fluid flows down the mesh members 45, the fluid regulates and/or controls the temperature of the room or enclosure in which it is located (e.g., by receiving and/or absorbing thermal energy from the air in the room or enclosure). Furthermore, when water is freely soluble in the fluid (e.g., when the fluid consists essentially of water), the fluid can also regulate and/or control the humidity level of the room or enclosure (e.g., by condensing water vapor from the air in the room or enclosure). For example, when the fluid consists essentially of water, depending on a number of factors (e.g., the temperature of the water in the cold fluid tank 35, the flow rate of the fluid down the plurality of mesh members 45, the outside temperature and/or humidity, the rate at which the building, room or enclosure exchanges heat and/or air with the outside environment, any subset or combination thereof, etc.), the present system can maintain the temperature of the room or enclosure in the range of 15-30° C., inclusive (or any temperature or range of temperatures therein, such as, e.g., 20-25° C.), and the relative humidity of the room or enclosure in the range of 30-70%, inclusive (or any value or range of values therein, such as, e.g., 40-60%, and ideally, at about 50%, which is an optimal humidity for comfort and/or for reducing or preventing dryness in mammalian and/or human mucous membranes). For example, water maintained at a temperature of 8° C. in the cold fluid tank 35 may, when the water flows down the mesh members 45, maintain a relative humidity of 50% in the room or enclosure. Although the present system is ideally suited for cooling a room or enclosure when the outside temperature is relatively high (e.g., above about 25-30° C.), the present system can also provide heat to the room or enclosure when the outside temperature is relatively low (e.g., using water that has been heated by solar energy prior to storage in the tank 35).

Adjusting the temperature of the water in the cold fluid tank 35 may adjust the temperature and/or relative humidity in the room or enclosure accordingly. Alternatively, regulation of the temperature and/or relative humidity in the room or enclosure may be controlled or adjusted by keeping the temperature (e.g., of the water in the cold fluid tank 34) constant and changing the number of mesh members 45 through which the water or other fluid flows. For example, one or more valves may be inserted in the main conduit 1, the distribution conduits 21, and/or a secondary conduit (not shown) between the main conduit 1 and a subset of the distribution conduits 21 that are configured to control the flow of water or other fluid to a subset of the mesh members 45. In one embodiment, each of the distribution conduits 21 includes a valve configured to allow water from the main conduit 1 to flow into the loop or pocket 4 or stop or prevent the water from flowing into the loop or pocket 4. Such valves can be controlled using an electronic control system. In alternative embodiments, a subset (e.g., 2, 4, 8, etc., or half, one-fourth, one-eighth, one-tenth, etc.) of the distribution conduits 21 are controlled by a solenoid valve and the remaining subset(s) by one or more other solenoid valves.

For example, a type of "binary" control of the water flow to the distribution conduits 21 can employ a first solenoid valve to turn the water on or off to half of the distribution conduits 21, a second solenoid valve to turn the water on or off to half of the remaining half (i.e., one-fourth) of the distribution conduits 21, a third second solenoid valve to turn the water on or off to half of the remaining one-quarter (i.e., one-eighth) of the distribution conduits 21, etc. Using such a control mechanism, a total of six (6) valves can control fluid flow to different subsets (e.g., $\frac{1}{2^n}$ [n being an integer of 0 to 6] or "binary" increments) of 64 distribution conduits 21 and mesh members 45.

The fluid from the suspended mesh members 45 is collected in a trough or pan 46 having a drainage or recirculation (e.g., a return or collection) conduit 47 connected thereto. The fluid then flows through the drainage or recirculation conduit(s) 47 into the cold fluid tank 34. The fluid is then pumped by pump 41 back to the vertical conduit 43 (e.g., into circulation). The fluid may pass through a filter 42 configured to remove particulate and/or other matter from the fluid. The filter 42 may be periodically cleaned (e.g., when the system is not operating due to maintenance, good weather, etc.).

As mentioned above, the fluid may absorb thermal energy from the room or enclosure, which may eventually reduce the effectiveness of the fluid in the cold fluid tank 34 in regulating and/or controlling the temperature (and optionally, the relative humidity) of the room or enclosure. Consequently, a fluid cooling subsystem may be added. The fluid cooling subsystem may comprise the compressor 32, the cooling tower 36 including the heat exchanger 33, the JT expander 34, and a heat exchanger 31 in the cold fluid tank 35. The cooling subsystem, which includes a separate and/or isolated working fluid, is generally conventional.

The compressor 32 compresses the working fluid in the cooling subsystem, thereby raising the temperature of the working fluid. The heat exchanger 33 in the cooling tower 36 rejects thermal energy from the working fluid to the outside environment (e.g., by drawing air over the heat exchanger 33 using a fan 37). The working fluid may be condensed in this process. The JT expander 34 reduces the pressure and the temperature of the working fluid, and the heat exchanger 31 in the cold fluid tank 35 absorbs thermal energy from the fluid in the cold fluid tank 35, thereby cooling the fluid. The fluid cooling subsystem can be run continuously, periodically, or intermittently (e.g., as needed).

The present invention also relates to a method of making an air conditioning and humidity control system, comprising operably connecting a main conduit to a pump, the main conduit being in fluid communication with the pump; forming one or more holes in each of a plurality of distribution conduits; operably connecting the plurality of distribution conduits to the main conduit, the plurality of distribution conduits being in fluid communication with the main conduit; placing a mesh member on each of the plurality of distribution conduits or other suspension member, each of the mesh members having a width, a length, and one or more suspension mechanisms at a first end thereof in contact with a corresponding one of the plurality of distribution conduits or other suspension member, such that each of the mesh members is configured to allow a fluid from the corresponding one of the plurality of distribution conduits to flow along its length; placing a trough or pan below a second end of the plurality of mesh members opposite from the first end, the trough or pan being configured to collect the fluid from the plurality of mesh members; and operably connecting the trough or pan to the pump such that the fluid can be transported from the trough or pan to the pump. The fluid advantageously comprises or consists essentially of water, although the invention is not limited thereto.

The method may further comprise placing a first section of the main conduit horizontally or substantially horizontally. The distribution conduits may then be connected to the first section of the main conduit. The method may also further comprise placing a second section of the main conduit vertically or substantially vertically. In such a case, the fluid may be pumped through the substantially vertical section to the substantially horizontal section of the main conduit.

The distribution conduits may be equally spaced along a length of the main conduit or the first section thereof. The distribution conduits may be joined to first and second opposed sides of the main conduit or the first section thereof, such that the fluid is distributed among first and second subsets of distribution conduits along the first and second opposed sides of the main conduit or the first section thereof, respectively.

In the present method of making an air conditioning and humidity control system, each of the distribution conduits may be connected to the main conduit or the first section thereof such that the distribution conduits extend horizontally or substantially horizontally from the main conduit or the first section thereof. Alternatively or additionally, each of the distribution conduits may be connected to the main conduit (or the first section thereof) such that the plurality of distribution conduits extend from the main conduit (or the first section thereof) parallel to one or more adjacent distribution conduits.

The present method of making an air conditioning and humidity control system may comprise or further comprise forming a plurality of holes in each of the distribution conduits. The holes may be spaced apart along a length of each distribution conduit. For example, the holes may be formed along a common line or axis along the length of each distribution conduit.

In some embodiments, each of the distribution conduits may have substantially equal dimensions and/or the same number of holes as the other distribution conduit(s). The holes in the distribution conduits may be in the same locations as in the other distribution conduit(s).

The present method of making an air conditioning and humidity control system may comprise or further comprise forming each of the suspension mechanism(s). Each suspension mechanism may comprise a loop. Forming the loop(s) may comprise forming an opening and a pocket in the end of the mesh member placed on the distribution conduits or other suspension member. The opening in each loop may have dimensions configured to slide the mesh member onto the corresponding distribution conduit(s) or other suspension member, and the pocket may have dimensions configured to distribute the fluid across the width of the mesh member. In examples in which each mesh member includes a single pocket, the ratio of the depth of each of the pockets to the width of the mesh member may be from 1:50 to 1:1, or any value or range of values therein. However, in an alternative example, two adjacent mesh members may have a pocket between or bridging them along substantially the entire length of the adjacent mesh members. In such an example, the pocket may be deeper (i.e., have a depth-to-mesh member width ratio of >1:1). In further alternatives, the mesh member may have multiple pockets along its width (e.g., which may be aligned with a corresponding number of holes in a corresponding distribution conduit), in which case the pockets may have a depth-to-mesh member width ratio of <1:1 (e.g., from 1:20 to 1:1) or >1:1 (e.g., from 1:1 to 10:1).

The present method of making an air conditioning and humidity control system may comprise or further comprise forming one or more holders at or near an end of each mesh member nearest to the trough or pan. In such embodiments, the method may further comprise placing a weight in at least one (e.g., each) holder. The holder(s) may comprise a second loop, pocket or opening, and may extend completely or substantially completely across the width of the mesh member.

Referring back to FIGS. 1A-B, in some embodiments, the mesh member(s) 5 may comprise a cloth or fabric. The cloth or fabric may comprise a natural fabric or fiber, such as cotton, flax, jute, hemp, bamboo or wool. In some cases, the cloth or fabric does not contain a synthetic fiber or material, such as nylon, polyester, rayon, acrylic, or polypropylene. Thus, the method may further comprise reinforcing a border of the cloth or fabric. Alternatively, the method may further comprise having one or more borders of the cloth or fabric reinforced.

Similarly to the present system and/or kit, the cloth or fabric may have a weight, a thickness and a permeability that allow the fluid to flow at a rate of 5-1000 ml/min·cm when the mesh member is completely suspended vertically from the distribution conduit(s). In further embodiments, the cloth or fabric may have a certain minimum roughness, to facilitate distribution of the water or other fluid evenly across the mesh member(s).

The foregoing descriptions of specific embodiments of the present invention have been presented for purposes of illustration and description. They are not intended to be or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. An air conditioning and humidity control system, comprising:
    a main conduit, configured to transport a fluid;
    a plurality of distribution conduits joined to the main conduit and in fluid communication with the main conduit, configured to receive the fluid from the main conduit, each of the plurality of distribution conduits having one or more holes therein to distribute the fluid;
    one or more mesh members, each mesh member having a width, a length, a first end, and one or more loops at the first end of each of the one or more mesh members, in contact with a corresponding one of the plurality of distribution conduits or (when present) a suspension member, wherein each of the one or more loops comprises (i) an opening having dimensions configured to slide the mesh member onto the corresponding distribution conduit or the suspension member and (ii) a pocket configured to distribute the fluid across the width of the mesh member, each mesh member is configured to receive the fluid from the one or more holes in a corresponding one or more of the plurality of distribution conduits, and each mesh member is configured to allow the fluid to flow along its length;
    one or more troughs or pans below a second end of the one or more mesh members opposite from the first end, configured to collect the fluid from the one or more mesh members; and
    a pump, configured to receive the fluid from the trough(s) or pan(s) and pump the fluid to and/or through the main conduit.

2. The system of claim 1, wherein the main conduit comprises a horizontal or substantially horizontal section to which the plurality of distribution conduits are joined.

3. The system of claim 1, wherein the plurality of distribution conduits are equally spaced along a length of the main conduit.

4. The system of claim 2, wherein each of the plurality of distribution conduits extend horizontally or substantially horizontally from the horizontal or substantially horizontal section of the main conduit.

5. The system of claim 1, wherein each of the plurality of distribution conduits have a plurality of holes spaced apart along a length of the distribution conduit.

6. The system of claim 1, wherein the one or more mesh members comprises a plurality of the mesh members, and each of the plurality of the mesh members further comprises (i) a holder at or near a lowermost end of the mesh member and (ii) a weight in the holder.

7. The system of claim 1, wherein each mesh member comprises a cloth or fabric.

8. The system of claim 7, wherein the cloth or fabric has properties including a thickness and a permeability that allow the fluid to flow at a rate of 5-1000 ml/min·cm when the mesh member is suspended vertically from the corresponding distribution conduit(s) or the suspension member.

9. The system of claim 1, wherein the fluid comprises or consists essentially of water.

10. A kit for an air conditioning and humidity control system, comprising:
    a main conduit, configured to transport a fluid;
    a plurality of distribution conduits connected or connectable to the main conduit and configured to receive the fluid from the main conduit, each of the plurality of distribution conduits having one or more holes therein to distribute the fluid;
    a plurality of mesh members, each mesh member having a width, a length, one or more suspension mechanisms at a first end thereof, a holder at or near a lowermost end of the mesh member, and a weight having dimensions configured to fit in the holder, wherein each mesh member is configured to receive the fluid from the one or more holes in a corresponding one or more of the plurality of distribution conduits and allow the fluid to flow along its length and/or width when suspended from its first end; wherein the one or more mesh members comprises a plurality of the mesh members, and each of the plurality of the mesh members further comprises (i) a holder at or near a lowermost end of the mesh member and (ii) a weight having dimensions configured to fit in the holder
    one or more troughs or pans configured to collect the fluid from the one or more mesh members when suspended by the plurality of distribution conduits; and
    a pump, configured to pump the fluid to and/or through the main conduit.

11. The kit of claim 10, wherein each of the connection mechanisms comprises a nipple or an opening, each nipple or opening being configured to mate with one of the plurality of distribution conduits.

12. The kit of claim 10, wherein each of the plurality of connection mechanisms are configured to join the plurality of distribution conduits to the main conduit such that each of the plurality of distribution conduits extends from the main conduit in a common plane.

13. The kit of claim 10, wherein each of the plurality of distribution conduits have a plurality of holes spaced apart along a length and a common line or axis of the distribution conduit.

14. The kit of claim 10, wherein the one or more mesh members comprises a plurality of the mesh members, and each of the one or more suspension mechanisms comprises one or more loops at the first end of each mesh member, in contact with a corresponding one of the plurality of distribution conduits.

15. The kit of claim 10, wherein each of the plurality of the mesh members comprises a cloth or fabric.

16. The kit of claim 15, wherein the cloth or fabric has properties including a thickness and a permeability that allow the fluid to flow at a rate of 5-1000 ml/min·cm when the mesh member is suspended vertically from the corresponding distribution conduit.

\* \* \* \* \*